Sept. 3, 1935.  D. I. REITER  2,013,446
LOCKING SPRING CLIP
Filed Jan. 29, 1935  2 Sheets-Sheet 1
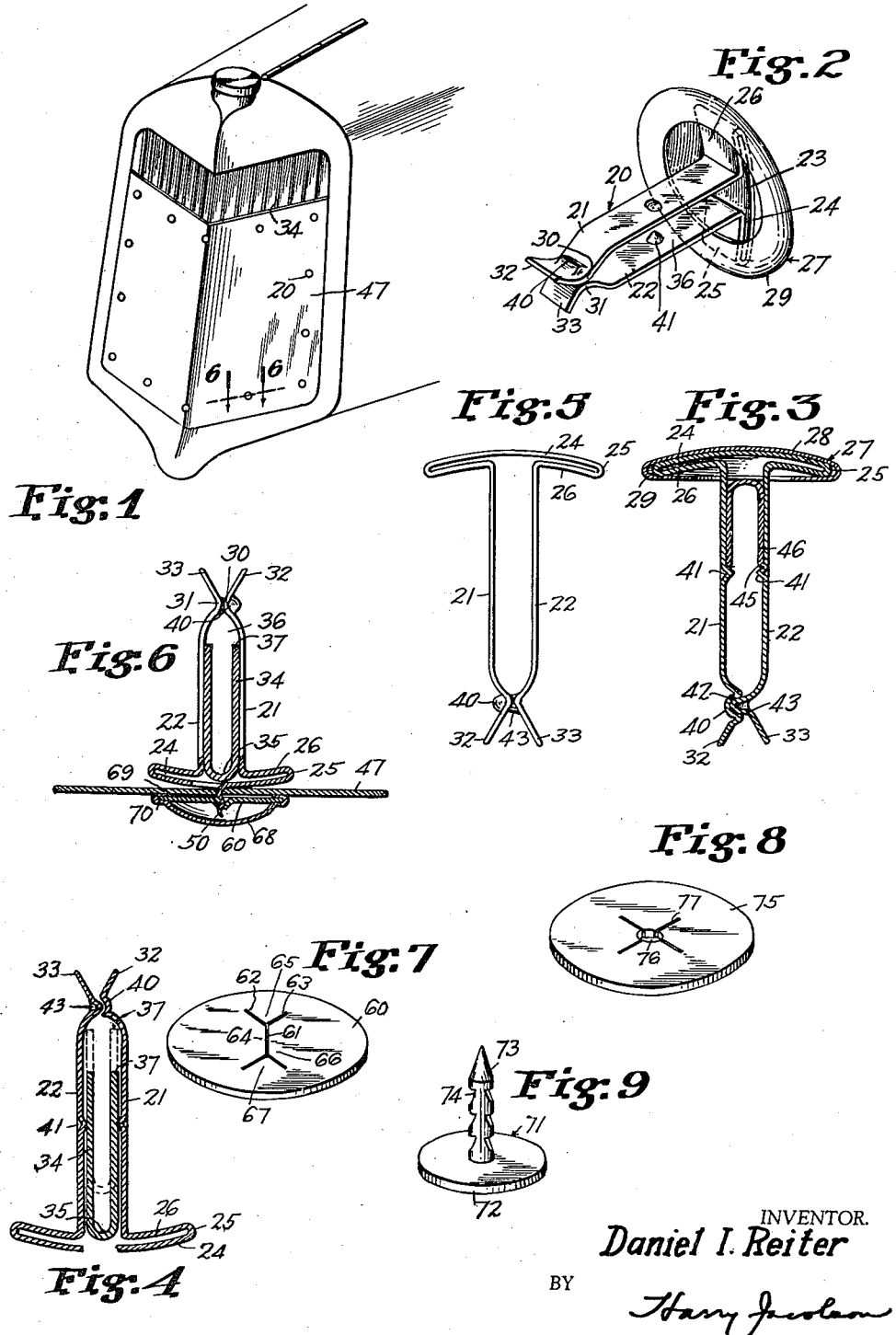
INVENTOR.
Daniel I. Reiter
BY
ATTORNEY.

Sept. 3, 1935.　　　D. I. REITER　　　2,013,446
LOCKING SPRING CLIP
Filed Jan. 29, 1935　　　2 Sheets-Sheet 2
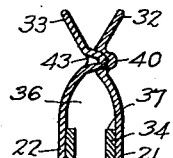
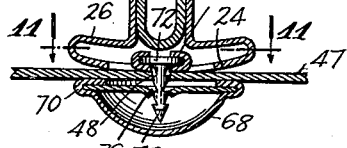
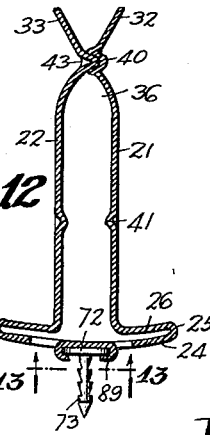
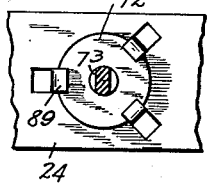
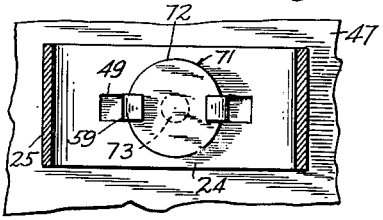
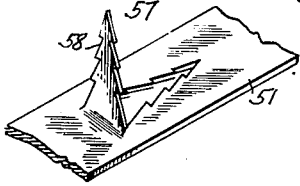
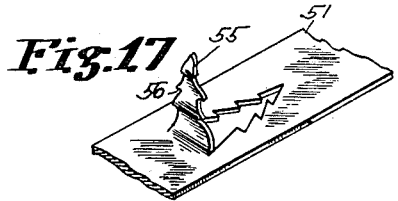
INVENTOR.
Daniel I. Reiter
BY
ATTORNEY.

Patented Sept. 3, 1935

2,013,446

UNITED STATES PATENT OFFICE 2,013,446

LOCKING SPRING CLIP

Daniel I. Reiter, New York, N. Y.

Application January 29, 1935, Serial No. 3,896

9 Claims. (Cl. 24—73)

This invention relates to spring clips and particularly to that type designed to secure a flexible cover of textile material or the like to the grill in front of the radiator of an automobile.

My invention contemplates the provision of a simple and inexpensive spring clip designed to permit the user to adequately secure a radiator cover or similar article in place in properly taut and stretched position, the clip being attachable to an automobile grill regardless of the positions of the grill bars.

My invention further contemplates the provision of a spring clip provided with an integral lock for preventing the clip, if partly opened under the vibration, shocks or jars to which the clip may be subjected, from springing off the bar about which it is clasped.

My invention further contemplates the provision of a spring clip adapted to be fitted to grill bars varying in length and to be self-held on the grill bar against accidental opening to such an extent as to permit the clip to spring off the bar.

My invention further contemplates the provision of a spring clip provided with means designed to pierce or penetrate and to be permanently secured to any desired point of the radiator cover which the clip is intended to hold in place, whereby the clip may be first engaged with a grill bar in such a manner that the radiator cover may be stretched taut on the clips and then readily secured permanently thereto.

The various objects of my invention will be clear from the description which follows, and from the drawings, in which, Fig. 1 is a perspective view of the radiator of an automobile provided with a flexible cover to which my invention has been applied.

Fig. 2 is a perspective view of one of the forms of my improved clip showing particularly, the locking and stop means thereof and also, the means for adapting the clip for use in connection with grill bars differing in width.

Fig. 3 is a longitudinal section of the same showing a narrow grill bar about which the clip is clasped.

Fig. 4 is a similar view of the same showing how the clip sides may be slightly spread apart when engaging a grill bar of unusual width and showing in dotted lines how relative movement of the clip and bar bring the locking means into operation to prevent undue retraction of the clip.

Fig. 5 is a front elevation of a modified form of my improved clip in which the intermediate projections have been omittid.

Fig. 6 is a vertical section of another modified form of my improved clip wherein means are provided on the clip to permit a cover to be secured to the clip after the clip has first been arranged in its proper position.

Fig. 7 is a perspective view of one form of the slitted disc usable preferably in connection with that form of my invention shown in Fig. 6.

Fig. 8 is a perspective view of a modified form of the slitted disc usable preferably though not necessarily in connection with attaching means having a round shank.

Fig. 9 is a perspective view of a tack or similar attaching means usable in connection with my improved clip and in place of the integral attaching member shown in Fig. 6.

Fig. 10 is a vertical section, similar to Fig. 6, of a modified form of my improved clip, showing the disc and tack of Figs. 8 and 9 in their operative positions, holding the clip to the sheet of material and showing the clip clasped about a bar.

Fig. 11 is a transverse section of the same, taken on the line 11—11 of Fig. 10.

Fig. 12 is a longitudinal section of a modified form of the clip wherein the tack is somewhat differently secured to the head.

Fig. 13 is a transverse section of the same, taken on the line 13—13 of Fig. 12.

Fig. 14 is a perspective view of a portion of the spring head of the clip showing another modified form of the means for securing the holding tack in place.

Fig. 15 is a similar view of a modified form of the same.

Fig. 16 is a perspective view of the clip blank showing one form of the integral attaching member partly severed from the material of the clip and showing also, the end locking means.

Fig. 17 is a similar fragmentary view of an enlarged scale of the same, showing another form of the attaching member.

Fig. 18 is a similar view of the same showing another form of the attaching member.

Fig. 19 is a longitudinal section of another modified form of my improved clip wherein the attaching member is formed from the material severed from the side of the clip to permit the clip to be clasped about a bar by a horizontal transverse movement.

In that practical embodiment of my invention which I have illustrated by way of example, and referring particularly to Figs. 1, 2, 3 and 4, I have there shown the clip 20 made preferably though not necessarily of a single strip of flat wire and bent to form the separable sides 21, 22 and the enlarged spring head 23, which head normally urges the sides 21 and 22 toward each other. As shown, the head comprises two thicknesses of material through the major part of its length, the outer thickness 24 extending laterally beyond the sides 21 and 22. At each of the ends of the thickness 24 there is provided an integral bend 25 joining the innermost thickness 26 of the material integrally to the thickness 24 and to one of the sides of the clip.

If desired, a suitable cap as 27 of sheet material, having a preferably imperforate domed portion 28, is secured to the head 23 of the clip by flanging the peripheral portion 29 of the cap about the bends 25 and on to the inner thickness 26 of the clip head. It will be understood, however, that the cap 27 may be entirely omitted if desired, particularly in connection with those forms of my invention hereinafter described.

Near the outermost or free end portions of each of the sides 21 and 22, said sides are bent inwardly into contact with each other as at 30 and 31, respectively, the terminal part of said end portions being flared or being made to diverge from each other. The free ends 32 and 33 of the clip are thereby spaced apart sufficient to permit the clip to be readily pushed on to and clasped about a grill bar as 34.

The grill bar having a rounded outer end portion 35, it readily enters the space between the ends 32 and 33, and when the clip is forced on to the bar, the rounded portion spreads the clip sides 21 and 22 apart against the action of the spring head 23, thereby permitting the grill bar to enter the space 36 between said sides. After the parts 30 and 31 of the clip have passed the innermost end 37 of the bar, the spring action of the head urges the sides 21 and 22 together and again carries the parts 30 and 31 into contact to cause the clip sides to engage the sides of the bar. While the clip has been described herein as made of flat wire, it will be understood that round wire or other forms of material may be used instead, as may be found convenient or desirable.

Combined locking and stop means are provided for preventing accidental complete retraction of the clip from the grill bar under the operating stresses thereon due to vibration, shock, jar and the like.

Said means includes the indented portion 40 made in the side 21 and arranged transversely of said side and projecting laterally and outwardly beyond said side to form a recess as 42. Adapted to enter said recess is the projection 43, pressed laterally and inwardly from the side 22 at the part 31 and normally in registration with the recess. In the normal positions of the parts, the sides 20 and 21 being urged together by the spring head 23, the projection 43 is engaged in the recess 42, whereby relative longitudinal and transverse movement of the clip sides is prevented, and the clip can be opened only by a spreading force acting on said side against the action of the spring head. As shown in Fig. 4, even though the clip sides should be partly separated, and the bar should slide toward the open end of the clip, the projection 43 nevertheless extends a sufficient distance across the clip opening to engage the outermost end 37 of the bar and consequently to prevent the clip from sliding completely off the bar accidentally at any time.

To make it possible to use a clip of a predetermined length on grill bars of different widths, I have illustrated in Figs. 2, 3 and 4, intermediate projections in the sides 21 and 22. Said projections extend from the respective clip sides toward each other a short distance sufficient to act as a stop for the outermost edge 45 of the grill bar 46 (see Fig. 3). Said projections 41, however, while pressed laterally from the material of the clip sides, are not made sufficiently deep to break the material. When the long clip is used in connection with a wide grill bar, the locking means 40, 43 prevents the clip from slipping off the grill bar even though the clip sides are slightly spread by the engagement of the wide grill bar 34 with the projections 41. For the narrower grill bars, the projections maintain the clip in proper position on the bar without danger of rattling or excessive lost motion.

It will be understood that in the form of my invention shown in Figs. 2 and 3 wherein the cap 27 is provided, the clip sides are passed through suitable grommets or eyelets in the radiator cover 47 and are clasped about the grill bar owing to the spring action of the head thereof. Should, however, the grommets be so arranged that the clip passed therethrough is not in proper registration with the grill bar, then the cover 47 will be excessively stretched or creased or wrinkled, since it becomes necessary for the clip to be clasped about the nearest grill bar and the positions of the clips cannot be varied, but are determined by the grommets.

In order to overcome this difficulty and to arrange the clips in the exact places required to keep the radiator cover stretched properly, the grommets or eyelets usually provided in the radiator cover are entirely eliminated and a new form of attaching means provided instead. Said means serves to secure the clip to the cover at the exact point required to insure registration of the clip with one of the grill bars.

To accomplish this purpose, I have shown in Figs. 6, 16, 17, 18 and 19, a projecting attaching element such as 50, 55 and 57 preferably pointed and in the nature of a prong or the like, of sufficient length to pierce the material of the cover from one side and to project beyond the other side thereof, and to permanently engage a suitable retaining head arranged on the other side or outside of the cover whereby the clip becomes secured to the cover and to the head with the cover held between the clip and the head.

As shown in Fig. 16, the attaching element 50 is cut from the material of the head of the clip blank 51 by means of a pair of converging intersecting cuts 52 and 53. The material thus severed is arranged at right angles to the clip head outer thickness 24 and as shown may be waved or corrugated.

As shown in Fig. 17, in addition to the corrugations of the attaching element 55, said element may be serrated at its edges as at 56, a series of such serrations being provided.

As shown in Fig. 18, the element 57 is merely serrated at its edges as at 58 and is not waved or corrugated.

It will be understood that the attaching element may be of any suitable shape though it is preferably pointed.

It will also be understood that while I have shown corrugations in the faces of the attaching element and/or serrations in its edges, it may be otherwise formed in a manner which is well understood in the art to assist in preventing its retraction from its engaging means soon to be described, though it may also be made without either serrations or corrugations and still function properly.

As shown in Figs. 7 and 8, the engaging means for the attaching element takes the form of a thin disc 60 or 75, preferably of spring metal and provided with a slit or slot 61 designed to permit the forceable passage of the attaching element therethrough. If the prong is of rectangular cross-section, additional intersecting slits as 62 and 63 may also be made diverging from each end of the slit 61. It will be seen that as the prong is forced through the slit 61, the yieldable sections 64, 65, 66 and 67 of the disc, surrounding the various slits therein, are bent in the direction of movement of the element and widen the slits and thereby permit the element to pass through the disc until stopped when said sections have yielded to their limit. The element, whether serrated, corrugated, notched or not, cannot then be retracted back through the slits, since the thus bent sections 64, 65, 66 and 67 have no room in which to collapse to their original positions.

The corrugations and serrations in the element aid to accomplish this purpose, whereby the disc becomes permanently attached to the clip. Said disc may be supported and arranged on the outer face of the cover 47 by any suitable means, which in the case illustrated, takes the form of a domed head 68, open at one end 69 and provided with a flange as 70 bent about the periphery of the disc and retaining the disc in place to close said open end 69. The attaching elements 50, 55 and 57 may be used with a disc 75, or with retaining discs having slits therein of various other forms, as will now be obvious.

To secure the cover sheet in place, a series of clips without their heads 68 are pushed on to the various grill bars at the spaced intervals desired, with the attaching elements projecting away from the bars. The cover sheet is then arranged in the position desired outside of the grill and stretched and simultaneously forced on to the attaching elements to cause said elements to penetrate the cover sheet and to maintain it in its stretched state and position. The head 68 is then forced on to each of the attaching elements through the cover sheet, whereby said elements are forced through the respective spring discs to hold the heads 68 thereto and to secure the heads and the clips permanently to the cover sheet, the sheet being thereby arranged between the clips and the head.

Should it be desired to remove the cover sheet, this may readily be done by a pull on the head 68 which causes the sides of the clips to spread as they move along the bars about which they are clasped. The locking means at the ends of the clips are also separated on such movement sufficiently to permit removal of the clips, whereby the cover sheet is removed from the grill bars together with the clips attached thereto.

It will be understood that if desired, the attaching element may be constructed as a separate member. Such member 71 is shown in Fig. 9 as comprising a head 72 and a pointed projecting shank 73 preferably provided with the longitudinally spaced ratchet indentations 74 therein.

The shank is adapted to be passed through and secured to a spring disc 75 similar to the disc 60 but provided with somewhat differently arranged slits. The disc 75 as shown is provided with a central aperture 76 of less diameter than that of the shank 73. Radiating from the aperture 76, are a series of spaced slits 77. It will be seen that when the shank 73 is forced through the opening 76, the yieldable sections of material between the slits 77 are bent in the direction of the movement of the shank through the disc in the same manner as has been hereinbefore described in connection with the disc 60.

The member 71 may be held to the clip in a great variety of different ways. I have, for purposes of illustration, shown a few of the various possible means for accomplishing this purpose. Referring particularly to Figs. 11 and 10, I have there shown the head 72 of the member 71 arranged on the inner face of the clip thickness 24, and the pointed shank 73 projecting through a perforation as 48 in the thickness 24. Bent from the material between suitable severing cuts as 49 in said thickness is the lug 59 bent about and securing the head 72 in position.

As shown in Figs. 13 and 14, the head 72 is arranged on the outer face of the thickness 24 and the lugs 89 bent similarly to the lugs 59 from and integral with the thickness 24 and about the periphery of the head at spaced intervals to secure the head in place to the clip. In Fig. 13, three spaced lugs 89 are shown, though it will be understood that any desired number thereof may be employed as may be found desirable.

As will be seen from Fig. 14, the head 72 may be secured to the thickness 24 by a separate band as 78, perforated as at 79 for the passage of the attaching shank 73, and extending across the thickness 24 and bent about the edges of and on to the inner face of said thickness.

As shown in Fig. 15, the head 72 may be arranged on the inner face of the thickness 24 and the shank 73 passed through a perforation 80 in said thickness. The band 81 passes about and across the thickness 24, being provided with lugs as 82 bent on to the head.

In Fig. 19, I have shown the spring clip 85 provided with the comparatively short head 86 extending between the sides 87 and 88 but provided with the cooperating locking members 40 and 43 similar to that hereinbefore described.

In this form of my invention, however, the attaching member as 50 is formed from one of the sides as 87 instead of from the head 86. This form of my clip may be used in certain cases where those forms shown hereinbefore cannot conveniently be used as for example, where the bars to which the clip is to be attached are not arranged in the customary manner. The disc-carrying head 68 is arranged in the proper manner on one face of the sheet to engage the attaching member 50 whereby the side 87 of the clip lies against the other face of the sheet of material.

It will be seen that I have provided a clip designed to be economically produced in large quantities and to be attached to a sheet of material at any desired point without the use of grommets, eyelets or the like, and thereby making it possible to removably secure a radiator cover in stretched position onto a series of spaced bars such as the grill bars of an automobile.

It will further be seen that I have provided a simple and inexpensive clip adapted to be readily but removably secured to bars varying in width without danger of becoming accidentally detached therefrom, and that my invention is designed to meet the severe requirements of practical use.

While I have shown and described certain specific embodiments of my invention, I do not wish to be understood as limiting myself thereto but intend to claim my invention as broadly as may be permitted by the state of the prior art and the scope of the appended claims.

I claim:

1. In a one-piece spring clip for use with the grill bar of an automobile radiator, clasping means for encompassing the grill bar, locking means on the clasping means for contacting with the inner edge of the grill bar to lock the clip to the grill bar against accidental removal, an elongated sheet penetrating member, and a slitted disc, the clip being adapted to be arranged on one side of a sheet of material with the elongated member passing through the sheet, and the disc being arranged on the other side of the sheet with the elongated member passing therethrough to secure the clip to and against retraction from the disc with the sheet therebetween whereby a series of clips may be arranged on the grill bars at spaced intervals in position to engage a radiator cover and said cover may then be stretched in place in an initial position on the elongated members and secured in proper registration with the sheet and the grill bar by said slitted discs, and the cover and said series of clips may be removed from the grill bars simultaneously and the cover may be reattached to the grill bars in its initial stretched position.

2. In a spring clip for use with the grill bar of an automobile radiator, said clip having a pair of yieldable sides adapted to clasp an object therebetween and bent into normal separable contact with each other, at a laterally extending projection intermediate the ends of each of the sides laterally projecting locking means at said projection, and means for securing the clip to a sheet comprising a sheet penetrating member on the clip and a slitted disc for engaging said member.

3. A one-piece spring clip for use with the grill bar of an automobile radiator and with a flexible cover for the radiator, said clip having similar sides provided with normally parallel portions engageable with the sides of the grill bar and clasping said bar, said sides being bent toward each other and being normally in contact with each other beyond the parallel portions, and means for preventing the clip from slipping off the grill bar when the normally contacting parts of the sides become slightly separated under vibration, comprising a projection extending inwardly from one of the sides toward the other side, said other side having a recess therein, said projection normally entering said recess but contacting with the innermost edge of the grill bar about which the clip is clasped when the clip is slightly retracted from the grill bar, thereby preventing the accidental removal of the clip from the grill bar, and means for securing the clip to said cover.

4. A grill-bar-engaging spring clip of a single length of flat wire for removably clasping a grill bar of an automobile radiator to hold a radiator cover thereto, comprising a pair of spaced elongated sides, each of said sides having a straight portion normally parallel to the straight portion of the other side and terminating in an outwardly flared portion, each of said sides having an outwardly concave portion joining the flared portion to the end of the straight portion, the concave portions of said sides being normally in contact, and inter-engaging locking and stop means on the clip comprising a recessed portion arranged at the concave portion of one of the sides, and a cooperating projection normally entering the recessed portion to lock the clip in place about the grill bar, said projection contacting with the inner edge of the grill bar when the clip is slightly retracted from the grill bar.

5. In a one-piece spring clip for use with a grill bar of an automobile radiator to detachably hold a radiator cover to the grill bar, means on the clip for clasping the grill bar, and pointed means extending from the clip for penetrating and extending beyond the material of the cover, and resilient slitted means for forcibly receiving the pointed means to permanently secure the clip to the resilient means and to the cover whereby the cover may be stretched into position and then secured to the clip by the forcible engagement of the pointed means with the resilient means after the pointed means has penetrated the cover to arrange the clip at the proper point of the cover to insure the re-engagement by the clip of the same grill bar on which the clip is initially arranged.

6. A spring clip for use with the grill bar of an automobile comprising a pair of similar sides parallel for the greater part of the lengths thereof, and bent into contact with each other between the parallel parts and the extremities of said sides, one of said sides having an indent at the point where said one side meets the other side, and a locking projection extending from the other side and entering the indent when the clip is clasped in its operative position about a grill bar, said projection contacting with the inner end of the grill bar to resist removal of the clip from the grill bar on slight retractive movement of the clip, and thereby preventing the clip from slipping off the grill bar.

7. A spring clip for use with the grill bar of an automobile comprising a pair of similar sides parallel for the greater part of the lengths thereof and bent into contact with each other between the parallel parts and the extremities of said sides, one of said sides having an indent at the point where said one side meets the other side, a locking projection extending from the other side and entering the indent when the clip is clasped in its operative position about a grill bar, said projection engaging the inner end of the grill bar to resist removal of the clip from the grill bar on slight retractive movement of the clip, thereby preventing the clip from slipping off the grill bar, and means for securing the clip to a radiator covering sheet arranged in front of the grill bars including a pointed sheet penetrating member projecting from the clip, and a cap operatively engaging that part of said member passed through the sheet.

8. An automobile-radiator-cover clip for use with the grill bar of an automobile radiator to hold a radiator cover in radiator-covering position, comprising yieldable means including separable sides for clasping the grill bar, a spring portion urging the sides into contact with each other, and fastening means for securing the clip to the cover including a pointed member extending from the clip for penetrating the radiator cover and a cap having operative engagement with the pointed member.

9. In a one-piece spring clip installation for use with the grill bar of an automobile radiator to detachably hold a radiator cover to the grill bar, a clip having sides thereon for clasping the bar, said sides being bent to normally contact with each other at a point inwardly of the grill bar, and a pointed and serrated cover penetrating member, and resilient slitted capping means for forcibly receiving the pointed member, to permanently secure the clip to said means and to the cover, and for capping the clip.

DANIEL I. REITER.